(12) United States Patent
Uyeki

(10) Patent No.: US 8,412,445 B2
(45) Date of Patent: Apr. 2, 2013

(54) PREDICTIVE ROUTING SYSTEM AND METHOD

(75) Inventor: Robert Uyeki, Torrance, CA (US)

(73) Assignee: Honda Motor Co., Ltd, Tokyo (JP)

( * ) Notice: Subject to any disclaimer, the term of this patent is extended or adjusted under 35 U.S.C. 154(b) by 17 days.

(21) Appl. No.: 13/030,957

(22) Filed: Feb. 18, 2011

(65) Prior Publication Data

US 2012/0215432 A1 Aug. 23, 2012

(51) Int. Cl.
*G01C 21/36* (2006.01)
*G08G 1/0968* (2006.01)

(52) U.S. Cl. .................. 701/117; 701/414; 701/415

(58) Field of Classification Search .......... 701/117–119, 701/414, 415, 417, 423
See application file for complete search history.

(56) References Cited

U.S. PATENT DOCUMENTS

| | | | | |
|---|---|---|---|---|
| 5,220,507 A * | 6/1993 | Kirson | ........................... | 701/533 |
| 5,931,888 A | 8/1999 | Hiyokawa | | |
| 5,933,094 A * | 8/1999 | Goss et al. | ..................... | 340/905 |
| 6,061,630 A * | 5/2000 | Walgers et al. | ............... | 701/414 |
| 6,230,099 B1 * | 5/2001 | Fabian | ........................... | 701/533 |
| 6,256,577 B1 * | 7/2001 | Graunke | ....................... | 701/117 |
| 6,298,302 B2 * | 10/2001 | Walgers et al. | ............... | 701/410 |
| 6,317,686 B1 * | 11/2001 | Ran | ............................... | 701/533 |
| 6,615,130 B2 | 9/2003 | Myr | | |
| 7,463,973 B2 * | 12/2008 | Okude et al. | ................... | 701/423 |
| 7,511,634 B2 * | 3/2009 | Stehle et al. | ................... | 340/905 |
| 7,689,348 B2 | 3/2010 | Boss et al. | | |
| 7,698,055 B2 | 4/2010 | Horvitz et al. | | |
| 2003/0225508 A9 * | 12/2003 | Petzold et al. | ................ | 701/201 |
| 2007/0135990 A1 * | 6/2007 | Seymour et al. | ............... | 701/117 |
| 2007/0150174 A1 * | 6/2007 | Seymour et al. | ............... | 701/200 |
| 2007/0208492 A1 | 9/2007 | Downs et al. | | |
| 2007/0219717 A1 * | 9/2007 | Chang | .......................... | 701/210 |
| 2008/0071466 A1 | 3/2008 | Downs et al. | | |
| 2008/0275640 A1 * | 11/2008 | Yun | ................................ | 701/202 |
| 2008/0319639 A1 | 12/2008 | Yamane | | |
| 2009/0088965 A1 | 4/2009 | Burckart et al. | | |
| 2009/0105940 A1 * | 4/2009 | Bitan | ............................ | 701/201 |

(Continued)

FOREIGN PATENT DOCUMENTS

| | | | |
|---|---|---|---|
| DE | 102007037938 A | * | 2/2009 |
| DE | 102008043167 A | * | 4/2010 |
| JP | 2005283395 A | * | 10/2005 |
| JP | 2006184106 A | * | 7/2006 |

OTHER PUBLICATIONS

Derwent English abstract for DE 102008043167 A.*
Derwent English abstract for DE 102007037938 A.*

(Continued)

*Primary Examiner* — James Trammell
*Assistant Examiner* — David Testardi
(74) *Attorney, Agent, or Firm* — Fenwick & West LLP; Mark Duell

(57) ABSTRACT

A user of a telematics-navigation device in a vehicle requests a recommendation as to a route to take to reach a destination. Multiple routes are identified from a current location of the vehicle to the destination. For each route, traffic conditions of the route are predicted. Based on the traffic conditions predicted for each route, one route is chosen to recommend to the user for traveling to the destination. The recommended route is presented to the user along with the other identified routes. When the user selects to travel along one of the presented routes, directions to the destination are provided to a driver of the vehicle along the selected route.

33 Claims, 6 Drawing Sheets

| Route | Miles | Normal Travel Time | Predicted Travel Time Based on Current Conditions | Likelihood of Congestion | Likelihood of an Accident |
|---|---|---|---|---|---|
| 1 | 35 | 40 min | 90 min | high | high |
| 2 | 45 | 55 min | 75 min | high | low |
| Recommended 3 | 55 | 60 min | 65 min | low | low |

U.S. PATENT DOCUMENTS

2009/0138187 A1* 5/2009 Mathias .................. 701/117
2010/0312466 A1* 12/2010 Katzer et al. ............... 701/201
2011/0137551 A1* 6/2011 Peri ........................... 701/201
2012/0179363 A1* 7/2012 Pierfelice .................. 701/423

OTHER PUBLICATIONS

I-95 Northeast Consultants, "Evaluation of Radio Data System—Traffic Message Channel as a Dynamic Driver Information System," I-95 Corridor Coalition, Oct. 1995, 50 pages.*

Ando, Y. et al., "Performance of Pheromone Model for Predicting Traffic Congestion," 2004, eight pages. [Online] [Retrieved Apr. 21, 2010] Retrieved from the Internet <URL:http://citeseerx.ist.psu.edu/viewdoc/download?doi=10.1.1.102.5925&rep=rep1&type=pdf.>.

Dailey, D., "The Use of Weather Data to Predict Non-recurring Traffic Congestion," Technical Report, Agreement T2695, Task 54, Weather and Congestion, Sep. 2006, twenty-six pages. [Online] [Retrieved Apr. 21, 2010] Retrieved from the Internet <URL:http://www.wsdot.wa.gov/research/reports/fullreports/655.1.pdf.>.

INRIX, Inc., "INRIX Total Fusion;" 2010, two pages. [Online] [Retrieved Apr. 21, 2010] Retrieved from the Internet <URL: http://www.inrix.com/totalfusion.asp.>.

LIFEHACKER.COM, "Google Maps Predicts Traffic Conditions for Your Travel Time," one page. [Online] [Retrieved from the Internet Apr. 21, 2010] Retrieved from the Internet <URL:http://lifehacker.com/381077/google-maps-predicts-traffic-conditions-for-your-travel-time.>.

* cited by examiner

FIG. 4A

| State | Location | Distance | Message | Conditions |
|---|---|---|---|---|
| Alabama | Highway 10 | 7 miles 412 | Fog Warning Recommended Speed 65 MPH | Visibility < 900 ft |
| | | 414 | Fog. Slow. Use Low Beams Recommended Speed 55 MPH | Visibility < 660 ft |
| | | 416 | Fog. Slow. Use Low Beams Recommended Speed 45 MPH | Visibility < 450 ft |
| | | 418 | Dense Fog Recommended Speed 35 MPH | Visibility < 280 ft |
| | | 420 | Road Closed Use Detour | Visibility < 175 ft |

FIG. 4B

| Message | Conditions |
|---|---|
| SLOW TRAFFIC AHEAD | Average speed between 11 and 35 mph |
| STOPPED TRAFFIC AHEAD | Average speed less than 11 mph |
| HIGH WIND WARNING | Wind speed greater than 35 mph |

| Weather Conditions Over a Period of Time | Road Conditions in the Past |
|---|---|
| Rain fall between 0 and 1.9 inches over 24 hours | No Effect on Traffic |
| Rain fall between 2.0 and 4.9 inches over 24 hours | Slow Traffic with Average Speeds of 35 MPH |
| Rain fall between 5 and 9.9 over 24 hours | Potential Flooding with Average Speeds of 10 MPH |
| Rain fall between 10 and 14.9 inches over 24 hours | Flooding/Road Closed Average Speeds 0 MPH |
| Rain fall > 15 inches over 24 hours | Serious Flooding/Road Closed Average Speeds 0 MPH |
| Heavy fog continuously for 5 hours between 8AM and 8PM on a Monday | Slow Traffic with Average Speeds of 15 MPH |

FIG. 5

| Route | Miles | Normal Travel Time | Predicted Travel Time Based on Current Conditions | Likelihood of Congestion | Likelihood of an Accident |
|---|---|---|---|---|---|
| 1 | 35 | 40min | 90min | high | high |
| 2 | 45 | 55min | 75min | high | low |
| 3 (Recommended) | 55 | 60min | 65min | low | low |

FIG. 6

PREDICTIVE ROUTING SYSTEM AND METHOD

FIELD OF THE EMBODIMENTS

The embodiments generally relate to routes traveled by vehicles to reach destinations and more particularly to predicting the traffic conditions of routes.

BACKGROUND

Typically there are multiple routes that a driver may take to reach a destination. Current systems exist that assist a driver in selecting a route to travel to reach a destination. These systems may select, for example, the route with the shortest travel time, that maximizes use of freeways, that minimizes freeways, or that avoids toll roads. One major factor often taken into account by these systems in selecting a route is real-time traffic information, which is information on the current traffic conditions. Typically a driver will want to avoid congested roads.

Real-time traffic information is usually only available for certain roads in urban areas where traffic sensors are placed. For those roads without sensors (e.g., roads in rural areas), the systems assume that the roads are not congested and that vehicles are traveling freely. However, such an assumption may be incorrect and a system may select for the driver to travel on a route that is heavily congested due to an accident, weather conditions or commuter traffic.

Thus, there is a need for a way to be able to predict the traffic conditions of routes for which real-time traffic information is not available.

SUMMARY

The embodiments provide a computer based method, a computer program product, and a computer system for predicting traffic conditions of a route. In some embodiments, a user of a telematics-navigation device in a vehicle requests a recommendation as to a route to take to reach a destination. Multiple routes are identified from a current location of the vehicle to the destination. For each route, traffic conditions of the route are predicted. The traffic conditions predicted for each route include a travel time for the route, the likelihood of congestion on the route, and the likelihood of there being an accident on the route. Traffic conditions for each route are predicted based on one or more of the following: message information that describes a message being displayed on a variable message sign, weather effect information that describes the effect that weather conditions over a period of time have had on a road in the past, and accident information describing accidents that have occurred on the route in the past under current circumstances.

Based on the traffic conditions predicted for each route, one route is chosen to recommend to the user for traveling to the destination. The recommended route is presented to the user along with the other identified routes. When the user selects to travel along one of the presented routes, directions to the destination are provided to a driver of the vehicle along the selected route.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the present subject matter.

BRIEF DESCRIPTION OF THE DRAWINGS

FIGS. 4A and 4B illustrate examples of messages and conditions that may be stored in a message database according to one embodiment.

FIG. 5 illustrates examples of weather conditions and past road conditions that may be stored in a historical database according to one embodiment.

FIG. 6 illustrates routes that may be presented to a user according to one embodiment.

Figure 1:
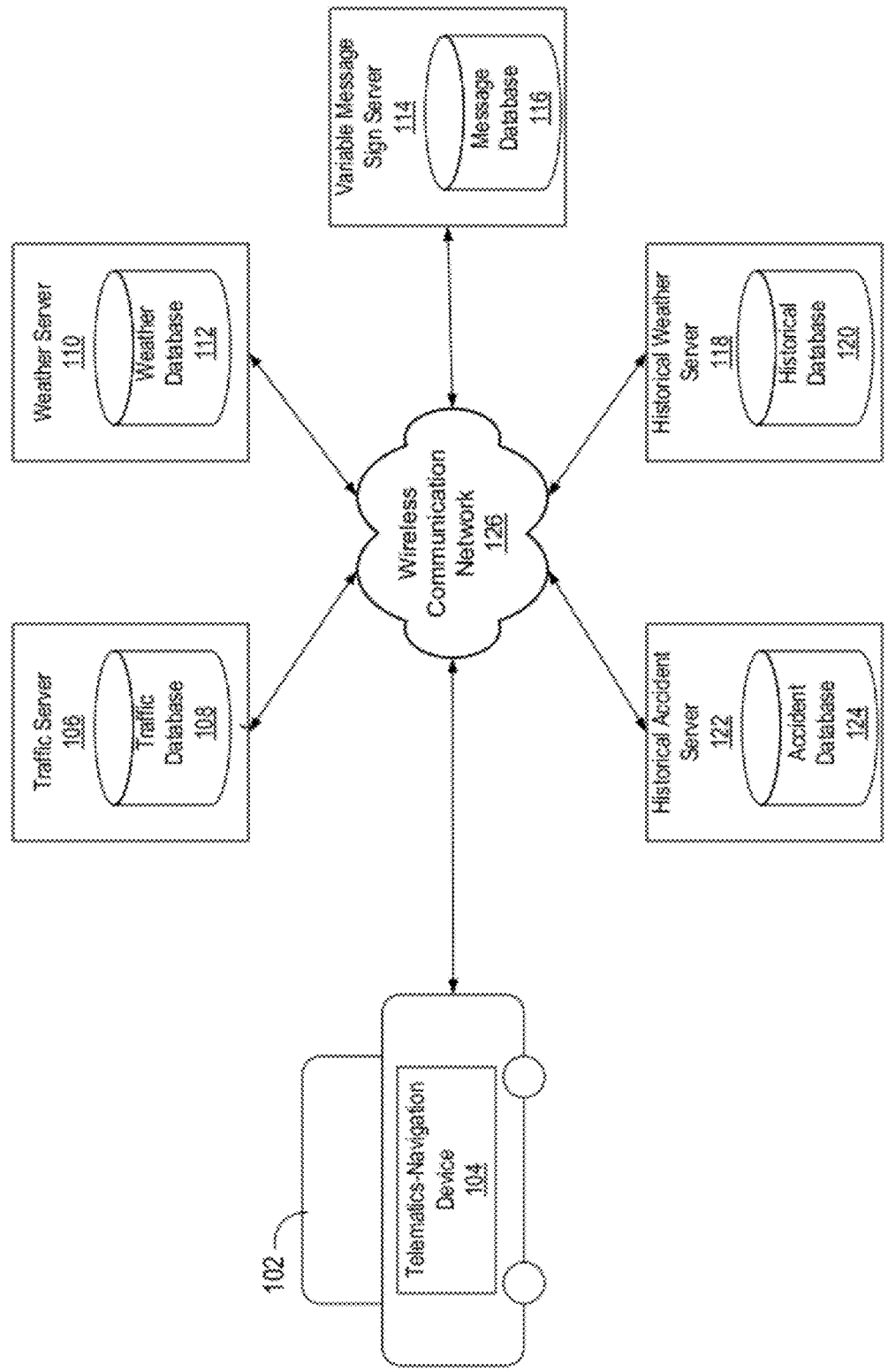
FIG. 1 is a high-level block diagram of a vehicle communication environment according to one embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

An embodiment is now described with reference to the figures where the left most digit of each reference number correspond to the figure in which the reference number is first used. Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments could be embodied in software, firmware or hardware, and when embodied in software, could be downloaded to reside on and be operated from different platforms used by a variety of operating systems.

The embodiments also relates to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the embodiments are not described with reference to any particular programming language. It will be appreciated that a variety of programming languages may be used to implement the teachings of the embodiments, and any references below to specific languages are provided for enablement and best mode of the embodiments.

In addition, the language used in the specification has been principally selected for readability and instructional purposes, and may not have been selected to delineate or circumscribe the inventive subject matter. Accordingly, the embodiments are intended to be illustrative, but not limiting, of the scope of the embodiments, which is set forth in the claims.

FIG. 1 is a high-level block diagram of a vehicle communication environment 100 according to one embodiment. FIG. 1 illustrates a vehicle 102, a traffic server 106, a weather server 110, a variable message sign server 114, a historical weather server 118, and a historical accident server 122 connected by a wireless communication network 126.

The vehicle 102 represents a motor vehicle that contains at least one engine for propulsion of the vehicle 102. The at least one engine may be an internal combustion engine or an electric motor. The vehicle 102 includes a telematics-navigation device 104 that predicts the traffic conditions of routes. In one embodiment, the traffic conditions predicted by the telematics-navigation device 104 for a route include the travel time for the route, the likelihood of congestion on the route, and the likelihood of there being an accident on the route. The travel time of a route is the amount of time it would take to travel the entire distance of the route. To predict the conditions of routes, the telematics-navigation device 104 retrieves information from entities coupled to the wireless communication network 126, as described in detail below.

In one embodiment, the telematics-navigation device 104 uses the predictions to make a recommendation to a user of the telematics-navigation device 104 as to which route should be taken to reach a destination. When a user wishes to travel to a destination and wants a recommendation as to a route to reach the destination, the user provides the destination to the telematics-navigation device 104. The telematics-navigation device 104 identifies multiple routes from the current location of the vehicle 102 to the destination (i.e., from a starting location to a destination location). A route as described herein is comprised of one or more roads. A road is a surface created for vehicles to travel on.

For each route, the telematics-navigation device 104 receives from the traffic server 106 real-time traffic information that is available for segments of the route. A segment is a portion of a route. In one embodiment, each route is divided into equal distance segments. For example, if a route is 10 miles in distance and the route is divided into 2 mile segment, 5 segments make up the route. In another embodiment, each road that is a part of a route is a segment. For each segment of the route for which real-time traffic information is not available, the telematics-navigation device 104 requests and receives information on the segment from the variable message sign server 114, the historical weather server 118, and the historical accident server 122.

For each route, the telematics-navigation device 104 predicts the traffic conditions of the route based on the information received from the traffic server 106, the variable message sign server 114, the historical weather server 118, and/or the historical accident server 122. Based on predicted traffic condition of each route, the telematics-navigation device 104 selects a route to recommend to the user as the best route to travel on to reach the destination. In one embodiment, the telematics-navigation device 104 presents the recommended route to the user along with the other routes that are available to reach the destination. In the display presented to the user, the recommended route is marked as being recommended. If one of the routes is selected, the telematics-navigation device 104 provides the driver of the vehicle 102 with turn by turn directions to the destination along the selected route.

Although the predicted traffic conditions are described herein as being used to recommend a route to a destination, it should be understood that the predicted traffic conditions can be used for other purposes. For example, predicted traffic conditions can be used to update a map that shows traffic conditions of roads or to send a message to a person with predicted traffic conditions for roads that are of interest to the person. It should also be understood that some of the functionality described herein with regards to the telematics-navigation device 104 may be performed by a server that communicates with the telematics-navigation device 104. For example, a third party-server may communicate with the servers coupled to the network 126 to predict the traffic conditions of routes, select a recommended route and provide the recommended route to the telematics-navigation device 104 so that it can presented to the user.

The traffic server 106 represents an entity that stores real-time traffic information of segments of roads and transmits real-time traffic information to the telematics-navigation device 104 upon request. The traffic server 106 stores the real-time traffic information in a traffic database 108. Real-time traffic information stored in the traffic database 108 for a segment of a road may include one or more of the following: the current average speed of vehicles on the segment, a congestion level that represents the amount of congestion on the segment, an indication of whether there is an accident or construction on the segment, and an indication of whether the segment is closed.

In one embodiment, the traffic server 106 updates the real-time traffic information stored in the traffic database 108 based on information provided by traffic sensors on roads. In one embodiment, traffic sensors measure the speed of vehicles traveling on the roads and based on the speed a determination can be made as to whether the roads are congested. In one embodiment, administrators manually update the real-time traffic information stored in the traffic database 108. For example, roads may have cameras and based on images captured by the cameras an administrator can determine whether a road is congested, whether there is an accident or construction on the road, and the speed of vehicles traveling on the road. Using the information obtained from the images, the administrator can update the traffic database 108. Upon request, the traffic server 106 transmits real-time traffic information stored in the traffic database 108 to the telematics-navigation device 104.

The weather server 110 represents an entity that stores weather information of different regions (e.g., segments of roads) and transmits weather information to the telematics-navigation device 104 upon request. The weather server 110 stores current weather information for different regions in a weather database 112. The weather information stored in weather database 112 for different regions may include one or more of the following: temperature, wind speed, wind direction, condition (e.g., cloudy, partly cloudy, sunny, showers, snowing, etc), and the rate of rain or snow fall. In addition to current weather information, the weather database 112 also includes past weather information and forecast weather information. An example of past weather information of a region includes the amount of rain or snow that has fallen within a certain period of time (e.g., the amount of rainfall in the past 12 and 24 hours). Examples of forecast weather information include the chances of precipitation or snow in the next 24 hours and the high and low temperatures expected on a future date.

The variable message sign server 114 represents an entity that stores information on messages being displayed on variable message signs. Variable message signs are electronic traffic signs placed on roads to inform drivers about upcoming road conditions or events. Messages on variable message signs may inform drivers, for example, of one or more of the following: accidents, congestion, road closure, road maintenance, road debris, and visibility levels. The variable message sign server 114 stores the messages being displayed on different variable message signs in a message database 116. In one embodiment, information associated with each message being displayed is stored with the message, such as the road on which the message is being displayed, the location of the road, and the road conditions that caused the message to be displayed.

FIG. 4A illustrates examples of messages that may be stored in the message database 116 according to one embodiment. Column 408 includes different messages (412, 414, 416, 418 and 420) that may be stored in the message database 116 for a variable message sign on highway 10 in Alabama. Column 410 includes the conditions that caused the display of the message. As an example, for message 418, visibility being less than 280 feet causes the display of the dense fog message 418. FIG. 4B provides other examples of messages that may be stored in the message database 116 and conditions that caused the display of the messages.

The variable message sign server 114 transmits variable sign message information to the telematics-navigation device 104 upon request. When the telematics-navigation device 104 requests variable sign message information from the variable message sign server 114 for a segment of a route, the variable message sign server 114 searches the message database 116 to determine whether there are any variable message signs on or near the segment. If there is at least one variable message sign on or near the segment and a message is currently being displayed on the sign, the variable message sign server 114 transmits the message to the telematics-navigation device 104 along with any information associated with the message (e.g., conditions that caused the message to be displayed).

Variable message sign information received from the variable message sign server 114 is valuable to the telematics-navigation device 104 in predicting the traffic conditions of routes. For example, assume that for a 7 mile road with a speed limit of 70 miles per hour (MPH), the traffic server 106 does not have any real-time traffic information but there is a variable message sign on the road. A message of "Dense Fog, Recommended Speed 35 MPH" is being displayed on the sign. Instead of assuming that traffic is flowing at a normal speed (i.e., 70 MPH), the telematics-navigation device 104 can use the message to better predict how fast vehicles are traveling on the road and estimate the travel time for the road. In this example, based on the message, the telematics-navigation device 104 would predict that vehicles are traveling at 35 MPH and would use the prediction in estimating the travel time for the road.

In one embodiment, the message database 116 is updated based on message sign information provided by Departments of Transportation (DOT) of different states. In another embodiment, each state's DOT maintains their own message database. Thus, in such an embodiment, the vehicle communication environment 100 of FIG. 1 would have multiple variable message sign servers and the telematics-navigation device 104 would determine which variable message sign server to communicate with based on the location of the road for which message information is needed.

The historical weather server 118 represents an entity the stores information on the effects that weather conditions over a certain period of time have had in the past on roads. In one embodiment, the weather conditions over a period of time may be cumulative or continuous. An example of cumulative weather conditions may be the amount of snow or rain that has fallen within a period of time. An example of continuous weather conditions may be consistent heavy fog or high winds over a period of time. The historical weather server 118 stores the information in a historical database 120. In one embodiment, the historical database 120 is organized by roads. For each road, the historical database 120 includes different weather conditions and for each weather condition, the database 120 includes road conditions that have occurred in the past based on the weather condition over a period of time. In one embodiment, for each weather condition, the road condition of the past that is included in the historical database 120 is the road condition that has occurred the most often throughout the history of the road.

FIG. 5 illustrates examples of weather conditions (502, 504, 506, 508, 510, and 512) and past road conditions that may be stored in the historical database 120 according to one embodiment. As an example, weather condition 508 provides that if between 10 and 14.9 inches of rain have fallen on the road over a span of 24 hours, in the past the road has been flooded and closed as a result. As another example, weather condition 512 provides that if there has been heavy fog continuously for the past 5 hours anytime between 8 AM and 8 PM on a Monday, in the past there has been slow traffic with average speeds of 15 MPH.

The historical weather server 118 transmits information stored in the historical database 120 to the telematics-navigation device 104 upon request. The information stored in the historical database 120 is valuable to the telematics-navigation device 104 in predicting the traffic conditions of roads. When a certain weather condition occurs over a period of time, the telematics-navigation device 104 can request information from the historical weather server 118 to find out what road conditions have occurred in the past as a result of the weather condition. By knowing what has occurred in the past, the telematics-navigation device 104 can predict that the current road conditions will be the same as in the past.

The historical accident server 122 is an entity that stores information on accidents that have occurred in the past on segments of roads. The historical accident server 122 stores information of past accidents on roads in the accident database 124. In one embodiment, for each road, the accident database 124 includes information on the number of accidents that have occurred on different segments of the road, during different months of the year, during different days of the week, during different times, and during different weather conditions. For example, the accident database 124 may include that for a certain segment of Highway 5 in California in the month of November, on a Monday between 6 AM and 7 AM, when rain is falling at a rate of 0.10 to 0.15 inches/hour there have been 1,000 accidents in the past 5 years. The telematics-navigation device 104 requests from the historical accident server 122 information on past accidents in order to predict the likelihood of there being an accident on a route. Upon request, the historical accident server 122 transmits accident information to the telematics-navigation device 104.

The wireless communication network 126 represents a communication pathway between the entities coupled to the network. In one embodiment, the wireless communication network 126 is a cellular network comprised of multiple base stations, controllers, and a core network that typically includes multiple switching entities and gateways. In one embodiment, the wireless communication network 126 is a wireless local area network (WLAN) that provides wireless communication over a limited area. In one embodiment, the WLAN includes an access point that connects the WLAN to the Internet. In one embodiment, the wireless communication network 126 is a combination of these.

Although FIG. 1 only illustrates a limited number of servers, it should be understood that vehicle communication environment 100 may include a number of additional servers. The traffic server 106, the weather server 110, the variable message sign server 114, the historical weather server 118, and the historical accident server 122 may communicate with a number of servers not shown to build or update their respective database. As an example, when an accident occurs, one server may notify the historical accident server of the location, time, and date of the accident (e.g., accident between exits 747 and 748 on CA Highway 5 at 7:30 PM on 1/25/11). Another server may notify the historical accident server of the weather conditions at the time of the accident (e.g., rain at a rate of 0.15 inches/hour). Based on this information, the historical accident server 122 can update the accident database 124.

Figure 2:
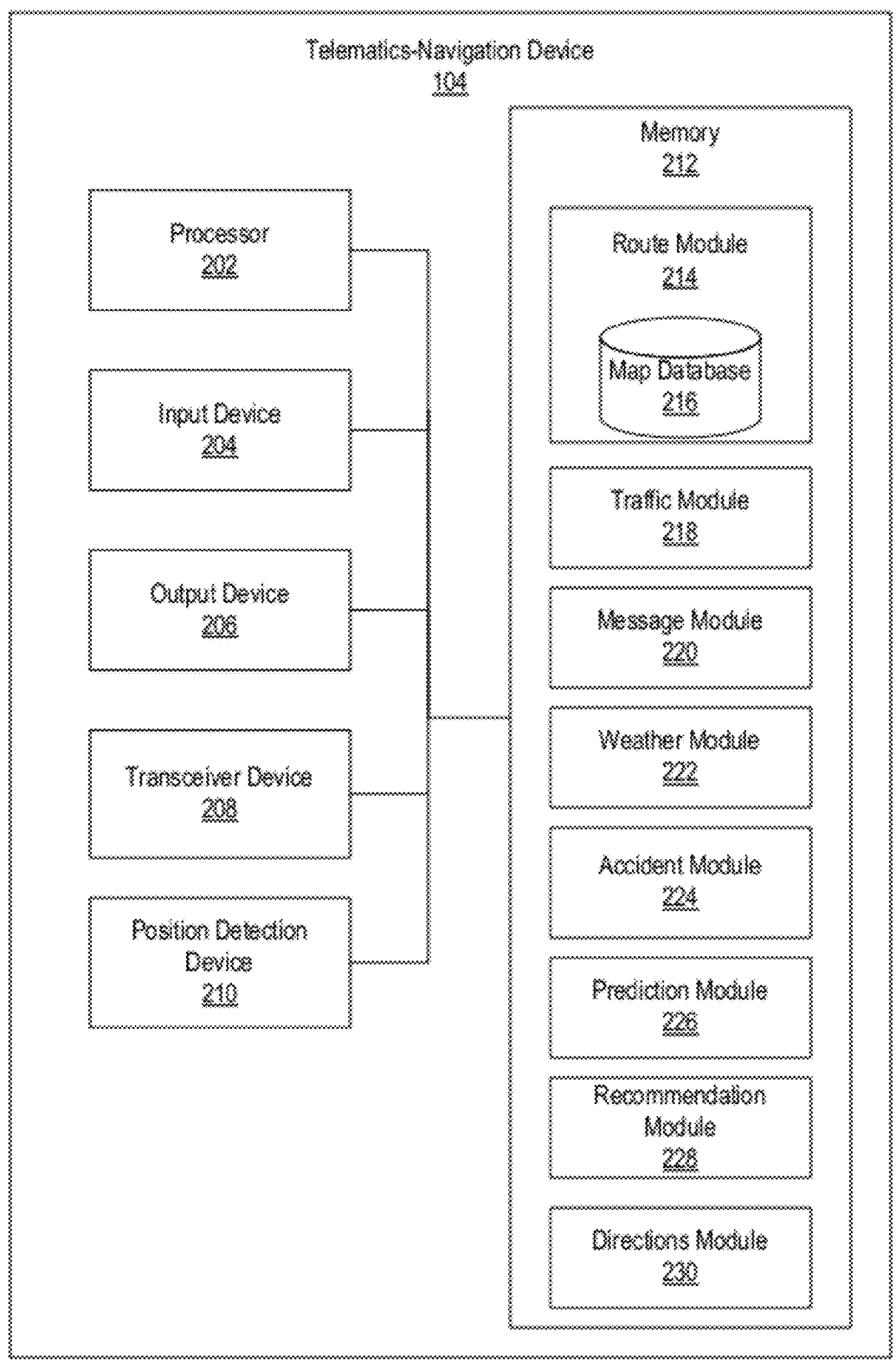
FIG. 2 is a high-level block diagram illustrating a detailed view of the telematics-navigation device according to one embodiment.

FIG. 2 is a high-level block diagram illustrating a detailed view of the telematics-navigation device 104 according to one embodiment. The telematics-navigation device 104 includes a processor 202, an input device 204, an output device 206, a transceiver device 208, a position detection device 210, and a memory 212.

The processor 202 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processor 202 comprises an arithmetic logic unit, a microprocessor, a general purpose computer, or some other information appliance equipped to transmit, receive and process electronic data signals from the memory 212, the input device 204, the output device 206, the transceiver device 208, or the position detection device 210.

The input device 204 is any device configured to provide user input to the telematics-navigation device 104 such as, a cursor controller or a keyboard. In one embodiment, the input device 204 can include an alphanumeric input device, such as a QWERTY keyboard, a key pad or representations of such created on a touch screen, adapted to communicate information and/or command selections to processor 202 or memory 212. In another embodiment, the input device 204 is a user input device equipped to communicate positional data as well as command selections to processor 202 such as a joystick, a mouse, a trackball, a stylus, a pen, a touch screen, cursor direction keys or other mechanisms to cause movement adjustment of an image.

The output device 206 represents any device equipped to display electronic images and data as described herein. Output device 206 may be, for example, an organic light emitting diode display (OLED), liquid crystal display (LCD), cathode ray tube (CRT) display, or any other similarly equipped display device, screen or monitor. In one embodiment, output device 206 is equipped with a touch screen in which a touch-sensitive, transparent panel covers the screen of output device 206. In one embodiment, the output device 206 is equipped with a speaker that outputs audio as described herein.

The transceiver device 208 represents a device that allows the telematics-navigation device 104 to communicate with entities via the wireless communication network 126. The transceiver device 208 is used by the telematics-navigation device 104 to communicate with the traffic server 106, the weather server 110, the variable message sign server 114, the historical weather server 118, and the historical accident server 122.

The position detection device 210 represents a device that communicates with a plurality of positioning satellites (e.g., GPS satellites) to determine the geographical location of the vehicle 102. In one embodiment, to determine the location of the vehicle 102, the position detection device 210 searches for and collects GPS information or signals from four or more GPS satellites that are in view of the position detection device 210. Using the time interval between the broadcast time and reception time of each signal, the position detection device 210 calculates the distance between the vehicle 102 and each of the four or more GPS satellites. These distance measurements, along with the position and time information received in the signals, allow the position detection device 210 to calculate the geographical location of the vehicle 102.

The memory 212 stores instructions and/or data that may be executed by processor 202. The instructions and/or data may comprise code for performing any and/or all of the techniques described herein. Memory 212 may be a dynamic random access memory (DRAM) device, a static random access memory (SRAM) device, Flash RAM (non-volatile storage), combinations of the above, or some other memory device known in the art. The memory 212 comprises multiple modules that are adapted to communicate with the processor 202, the input device 204, the output device 206, the transceiver device 208, and/or the position detection device 210.

A route module 214 identifies different routes to a destination. When a request is received by a user of the telematics-navigation device 104 via the input device 204 for a route to a destination, the route module 214 receives from the position detection module 210 the current geographic location of the vehicle 102. Based on the current location and the destination, the route module 214 retrieves a vector map from a map database 216. The map database 216 includes multiple vector maps. The route module 214 locates the current location and the destination on the map. The route module 214 identifies multiple routes from the current location to the destination. A traffic module 218 communicates with the traffic server 106 to retrieve real-time traffic information. For each route identified by the route module 214 to a destination, the traffic module 218 sends a request to the traffic server 106 for real-time traffic information for segments that makeup the route. The traffic module 218 receives from the traffic server 106 in response to a request, real-time traffic information for segments for which information is available. As is described below, a prediction module 226 uses the information received from the traffic server 106 to predict the traffic conditions of the route.

A message module 220 communicates with the variable message sign server 114 to receive message information on messages being displayed on variable message signs. For each segment of a route identified by the route module 214 for which real-time traffic information was not available, the message module 220 requests from the variable message sign server 114 message information on any messages being displayed on or near the segment. In one embodiment, the request includes the name of the road that the segment is a part of and the location of the segment (e.g., state, city, and/or geographical coordinates). If a message is being displayed on a variable message sign on or near the segment, the message module 220 receives from the variable message sign server 114 message information that includes the message being displayed, conditions that caused the display of the message and any other information associated with the message. As is described below, the prediction module 226 uses the information received from the variable message sign server 114 to predict the traffic conditions of the route.

A weather module 222 communicates with the weather server 110 and the historical weather server 118. For each segment of a route identified by the route module 214 for which real-time traffic information was not available, the weather module 222 requests from the weather server 110 past weather information for the segment. As described above, past weather information may be, for example, the amount of rain or snow that has fallen in the past 24 hours or heavy fog for the past 3 hours. The weather module 222 transmits weather information received from the weather server 110 for the segment to the historical weather server 118 as a weather condition. In one embodiment, along with the weather condition, the weather module 222 transmits to the historical weather server 118 the name of the road that the segment is a part of and the location of the segment. In response to the transmission of the weather condition, weather module 222 receives from the historical weather server 118 weather effect information that includes a road condition that has occurred in the past on the segment as a result of the weather condition. As is described below, the prediction module 226 uses the road condition received from the historical weather server 118 to predict the traffic conditions of the route.

An accident module 224 communicates with the historical accident server 122 to receive information on past accidents (i.e., accident information). For each segment of a route identified by the route module 214, the accident module 224 requests from the historical accident server 122 the number of accidents that have occurred in the past on the segment under current circumstances. In one embodiment, so that the historical accident server 122 can identify the number of accidents that have occurred in the past on the segment under current circumstances, the accident module 224 includes one or more of the following in the request: the name of the road that the segment is a part of, the location of the segment, the current month, day of the week, time, weather information received from the weather server 110 and a period of time for which to provide the number of accidents (e.g., accidents under similar conditions in the past 5 years). In response to the request, the accident module 224 receives from the historical accident server 122, accident information that includes a number of accidents that have occurred in the past on the segment under similar circumstances. As is described below, the prediction module 226 uses the number of past accidents received from the historical accident server 122 to predict the traffic conditions of the route.

A prediction module 226 predicts the traffic conditions of routes using information received by the traffic module 218, the message module 220, the weather module 222, and the accident module 224. In one embodiment, for each route identified by the route module 214 to a destination, the prediction module 226 predicts the following traffic conditions: the travel time for the route, the likelihood of congestion on the route, and the likelihood of an accident on the route.

In one embodiment, predicting the travel time for a route includes the prediction module 226 identifying each segment of the route, calculating the travel time for each segment and summing the calculated travel times of the route's segments. To calculate the travel time for a segment, the prediction module 226 determines whether the traffic module 218 received real-time traffic information for the segment. If real-time traffic information was received, the prediction module 226 calculates the travel time for the segment using the real-time traffic information. In one embodiment, real-time traffic information includes the current average speed of vehicles on the segment. In this embodiment, the prediction module 226 calculates the travel time of the segment using a formula of the travel time is equal to the travel distance of the segment divided by current average speed of vehicles on the segment.

If real-time traffic information was not available for the segment, the prediction module 226 calculates the travel time for the segment using a formula of the travel time is equal to the travel distance divided by a predicted speed. The predicted speed is a prediction of the average speed that vehicles that are currently traveling on the segment. In one embodiment, the prediction module 226 determines the predicted speed using information received by either the message module 220 or the weather module 222. The prediction module 226 determines whether the message module 220 and weather module 222 were each able to receive information on the segment. If information on the segment was received, the prediction module 226 determines whether the predicted speed can be determined based on the information. In one embodiment, a predicted speed can be determined if the information includes a vehicle speed (e.g., recommended speed or average speed).

If only one of the modules received information that can be used to determine the predicted speed, the prediction module 226 selects to use the information received by that module to determine the predicted speed. If both modules received information that can be used to determine the predicted speed, the prediction module 226 determines which information to use based on a set priority. The priority may be, for example, use information received by the message module 220 over the information received by the weather module 222. In one embodiment, the priority is set by a system administrator. In one embodiment, if neither the message module 220 nor the weather module 222 received information that can be used to determine the predicted speed for the segment, the prediction module 226 determines that the predicted speed is the normal speed limit of the segment.

When the prediction module 226 selects to use information received by either the message module 220 or the weather module 222 to determine the predicted speed, the prediction module 226 determines that the predicted speed for the segment is the vehicle speed included in the information. For example, if information received by the message module 220 is being used to determine the predicted speed and the information received is message 416 of FIG. 4A, the prediction module 226 would determine that the predicted speed is 45 MPH. As another example, if information received by the weather module 222 is being used to determine the predicted speed and the information received is the past road condition associated with weather condition 506 of FIG. 5, the prediction module 226 would determine that the predicted speed is 10 MPH.

In one embodiment, the prediction module 226 predicts the likelihood of congestion of a route by assigning a congestion level to the route. In one embodiment, the congestions level may be, for example, a congestion percentage, such as 50% likelihood of congestion. In another embodiment, the congestion level may be a high, medium, or low level of congestion. To determine the congestion level of the route, the prediction module 226 identifies each segment of the route, determines a congestion level for each segment, and determines the congestion level of the route to be the highest congestion level from the multiple segments of the route. For example, assume the route has two segments and that the prediction module 226 determines that the congestion level of the first segment is low and the congestion level of the second segment is high. The prediction level 226 would determine that the likelihood of congestion of the route is high.

To determine the congestion level of a segment, the prediction module 226 determines whether the traffic module 218 received real-time traffic information for the segment. If real-time traffic information was received, the prediction module 226 determines the congestion level of the segment using the real-time traffic information. In one embodiment, real-time traffic information includes a congestion level and the prediction module 226 assigns the congestion level of the real-time traffic information to the segment.

In one embodiment, if real-time traffic information was not received for the segment, the congestion level is determined by the prediction module 226 using the normal travel time for the segment (i.e., the time it takes to travel the distance of the segment at the speed limit) and the travel time predicted for the segment. In one embodiment, the predictions module 226 receives the normal travel time from the map database 216. The prediction module 226 subtracts the predicted travel time from the normal travel time and assigns the congestion level based on the difference value. In one embodiment, a range is associated with each congestion level. The prediction module 226 determines the congestion level based on the range that the difference value falls within. For example, it may be that if the predicted travel time for a segment is 10 to 15 minutes more than the normal travel time, a high congestion level is assigned to the segment.

In another embodiment, if real-time traffic information was not received for the segment, the congestion level is determined by the prediction module 226 using accident information received by the accident module 224 for the segment. The accident information received by the accident module 224 is the number of accidents that have occurred in the past on the segment under current circumstances. The prediction module 226 assigns a congestion level to the segment based on the range that the number of previous accidents falls within. As an example, if a large number of accidents have occurred on the segment in the past under circumstances that are similar to the current circumstances, there is a higher chance that there is currently an accident on the segment and as a result also congestion. Therefore, in this example a high congestion level would be assigned to the segment.

In one embodiment, the prediction module 226 predicts the likelihood of an accident on a route by assigning an accident level to the route. The accident levels may be similar to those described above for the congestion levels. To determine the accident level of the route, the prediction module 226 identifies each segment of the route, determines an accident level for each segment, and determines the accident level of the route to be the highest accident level from the multiple segments of the route.

To determine the accident level of a segment, the prediction module 226 determines whether the traffic module 218 received real-time traffic information for the segment. If real-time traffic information was received, the prediction module 226 determines the accident level of the segment using the real-time traffic information. In one embodiment, real-time traffic information includes an indication as to whether there is currently an accident on or near the segment. The prediction module 226 determines the accident level based on whether there is an accident on or near the segment. For example, the prediction module 226 may assign an accident level of high if there is an accident on the segment and assign an accident level of low if there is no accident.

In one embodiment, if real-time traffic information was not received for the segment, the accident level is determined by the prediction module 226 using information received by the accident module 224 for the segment. The information received by the accident module 224 is the number of accidents that have occurred in the past on the segment under current circumstances. The prediction module 226 assigns an accident level to the segment based on the number of previous accidents. In one embodiment, an accident number range is associated with each accident level that can be assigned to a segment. The prediction module 226 determines the accident level based on the range that the number of previous accident falls within.

In one embodiment, if real-time traffic information was not received for the segment and message information received by the message module 220 for the segment indicates that there is an accident on or near the segment, the prediction module 226 automatically assigns an accident level to the segment (e.g., accident level of high) without using the accident module 224 information. In another embodiment, if real-time traffic information was not received for the segment and weather effect information received by the weather module 222 for the segment indicates that an accident has occurred on the segment in the past, the prediction module 226 assigns an accident level to the segment based on the weather effect information received by weather module 222 (e.g., accident level of high).

The recommendation module 228 determines which route of those identified by the route module 214 to a destination to recommend to a user. In one embodiment, the recommendation module 228 selects the recommended route to a destination based on user criteria and traffic conditions predicted for the different routes. The user criteria may be, for example, one or more of the following: recommend the route with the shortest predicted travel time, avoid areas with a high likelihood of congestion, and avoid areas with a high likelihood of an accident.

The recommendation module 228 presents to the user of the telematics-navigation device 104 the routes identified by the route module 214 to a destination. In one embodiment, information presented for each route includes one or more of the following: the mileage of the route, the normal travel time, the predicted travel time, the likelihood of congestion, and the likelihood of an accident. The recommendation module 228 uses an indicator to show which route was selected as being recommended. FIG. 6 is an example of the routes presented to a user by the recommendation module 228 according to one embodiment. As can be seen, in this example, route three is marked as being recommended.

The directions module 230 provides drivers with directions to a destination. When a route is selected for traveling to a destination, the directions module 230 provides the driver of the vehicle 102 with turn by turn directions along the selected route until the destination is reached. In one embodiment, as the driver is being routed to a destination, the directions module 230 warns the driver of potentially dangerous areas. In one embodiment, the directions module 230 warns the driver of areas where there is a high likelihood of an accident. When the vehicle 102 is within a certain distance of a segment of a route, the directions module 230 determines the number of past accidents received by the accident module 224 for the segment. If the number of past accidents is above a threshold, the directions module 230 warns the driver to approach the upcoming segment with caution because accidents are common in the segment under the current circumstances. In one embodiment, the directions module 230 provides the driver with driving suggestions to avoid an accident. For example, assume that a driver is driving along a route and that it is currently raining. The directions module 230 may warn the driver that a high number of accidents have occurred in the past in the upcoming segment due to rain and may suggest to the driver that he or she drive at half the speed limit.

It should be apparent to one skilled in the art that the telematics-navigation device 104 may include more or less components than those shown in FIG. 2 without departing from the spirit and scope of the embodiments. For example, the telematics-navigation device 104 may include additional memory, such as, for example, a first or second level cache, or one or more application specific integrated circuits (ASICs). Similarly, telematics-navigation device 104 may include additional input or output devices. In some embodiments one or more of the components can be positioned in close proximity to each other while in other embodiments these components can be positioned in different locations. For example the units in memory 212 of the telematics-navigation device 104 can be programs capable of being executed by one or more processors located in other devices in the vehicle 102.

Figure 3:
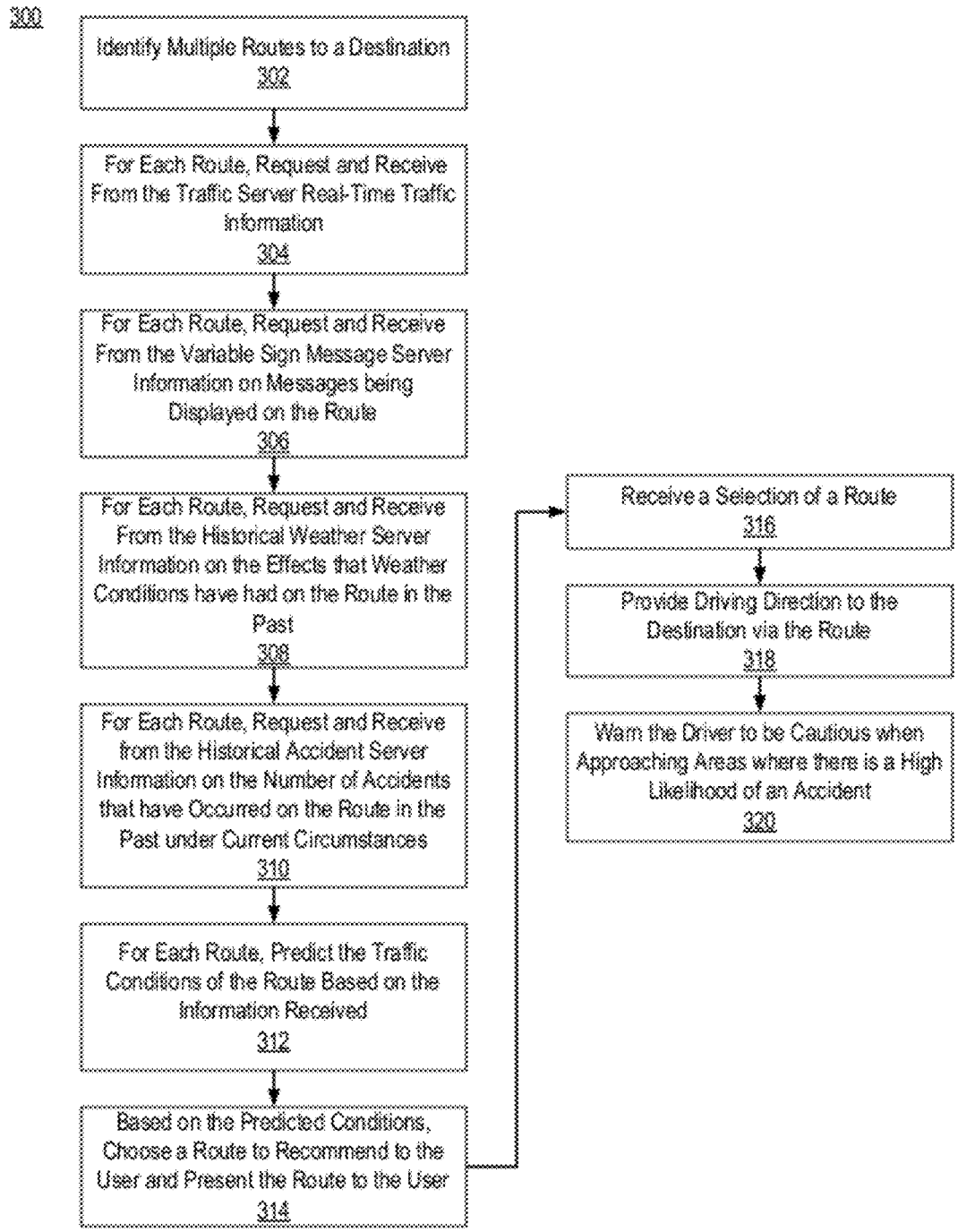
FIG. 3 is a flow chart of a method for recommending a route to a user to reach a destination according to one embodiment.

FIG. 3 is a flow chart 300 of a method for recommending a route to a user to reach a destination according to one embodiment. In one embodiment, the steps of the method are implemented by the processor 202 of the telematics-navigation device 104 executing instructions that cause the desired actions. Those of skill in the art will recognize that one or more of the method steps may be implemented in embodiments of hardware and/or software or combinations thereof. For example, instructions for performing the described actions are embodied or stored within a computer readable medium. Furthermore, those of skill in the art will recognize that other embodiments can perform the steps of FIG. 3 in different orders. Moreover, other embodiments can include different and/or additional steps than the ones described here.

Assume for purposes of this method that a user of the telematics-navigation device 104 has requested a recommendation of a route to reach a destination. The telematics-navigation device 104 identifies 302 multiple routes from the current location of the vehicle 102 to the destination. For each route, the telematics device 106 requests and receives real-time traffic information 304 for the route and information 306 on messages being displayed on variable message signs along the route. The real-time traffic information is received from the traffic server 106 and the message information is received from the variable message sign server 114. The telematics-navigation device 104 also requests and receives information 308 on the effects that weather conditions over a period of time have had on the route in the past and information 310 on the number of accident that have occurred on the route in the past under the current circumstances. The telematics-navigation device 104 receives the weather effect information from the historical weather server 118 and accident information from the historical accident server 122. The telematics-navigation device 104 predicts 312 the traffic conditions of the route based on the information received from the various servers.

Based on traffic conditions predicted for each route, the telematics-navigation device 104 chooses 314 one of the routes to recommend to the user for reaching the destination. The telematics-navigation device 104 presents the recommended route to the user along with the other routes that are available to the destination. The device 104 uses an indicator to show which route is the recommended route. When the user selects 316 to travel along one of the presented routes, the telematics-navigation device 104 provides 318 the driver of the vehicle 102 with driving direction to the destination via the route. As the driver is traveling along the selected route, the telematics-navigation device 104 warns 320 the driver to be cautious when approaching areas where there is a high likelihood of an accident.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments present disclosure without departing from the spirit and scope of the disclosure.

The invention claimed is:

1. A computer-implemented method for predicting traffic conditions of a route, the method comprising:
    identifying, by a computer system, a plurality of routes for a vehicle between a starting location and a destination location;
    determining, by a computer system for each of the plurality of routes, predicted traffic conditions that include a travel time for the route, a likelihood of congestion on the route, and a likelihood of an accident on the route, wherein one or more of the traffic conditions are determined based on a message being displayed on a variable message sign external to the vehicle and installed on or near the route; and
    presenting to a user of the vehicle, by the computer system for each of the plurality of routes, each of the traffic conditions determined for the route.

2. The method of claim 1, wherein the starting location is a current location of the vehicle.

3. The method of claim 1, wherein the travel time for one of the plurality of routes is determined based on a vehicle speed included in the variable message sign.

4. The method of claim 1, wherein determining the travel time for one of the plurality of routes comprises:
receiving message information describing the message being displayed on the variable message sign, the message information including a condition that caused the display of the message; and
predicting the travel time for the route based on a vehicle speed included in the condition.

5. The method of claim 1, wherein determining the travel time for one of the plurality of routes comprises:
calculating a travel time for each of a plurality of segments of the route; and
summing the calculated travel times.

6. The method of claim 1, wherein determining the likelihood of congestion for one of the plurality of routes comprises:
determining a congestion level for each of a plurality of segments of the route; and
predicting the likelihood of congestion based on the congestion levels determined for the plurality of segments.

7. The method of claim 1, wherein
determining the likelihood of an accident for one of the plurality of routes comprises:
determining an accident level for each of a plurality of segments of the route; and
predicting the likelihood of an accident on the route based on the accident levels determined for the plurality of segments.

8. The method of claim 1, further comprising:
determining from the plurality of routes a route to recommend based on the determined traffic conditions; and
indicating to the user which of the plurality of routes is recommended.

9. The method of claim 1, further comprising:
directing a driver of a vehicle along one of the plurality of routes; and
warning the driver when approaching a segment of the route with a high likelihood of an accident.

10. The method of claim 1, wherein a telematics-navigation device at a vehicle wirelessly receives information on the message being displayed on the variable message sign and determines the traffic conditions of the routes.

11. The method of claim 1, wherein a server in communication with a telematics-navigation device determines the traffic conditions of the routes.

12. A computer-implemented method for predicting traffic conditions of a route, the method comprising:
identifying, by a computer system, a plurality of routes for a vehicle between a starting location and a destination location;
determining, by the computer system for each of the plurality of routes, predicted traffic conditions that include a travel time for the route, a likelihood of congestion on the route, and a likelihood of an accident on the route, wherein one or more of the traffic conditions are determined based on weather effect information describing effects that weather conditions over a period of time have had on a road of the route in the past; and
presenting to a user of the vehicle, by the computer system for each of the plurality of routes, each of the traffic conditions determined for the route.

13. The method of claim 12, wherein the starting location is a current location of the vehicle.

14. The method of claim 12, wherein the weather effect information describes the effects that cumulative weather conditions over a period of time have had on the road of the route in the past.

15. The method of claim 12, wherein the weather effect information describes the effects that continuous weather conditions over a period of time have had on the road of the route in the past.

16. The method of claim 15, wherein the travel time for one of the plurality of routes is determined based on the weather effect information, the weather effect information including a vehicle speed.

17. The method of claim 12, wherein each of the plurality of routes is comprised of a plurality of segments and determining the travel time for one of the plurality of routes comprises:
calculating a travel time for each of the plurality of segments of the route; and summing the calculated travel times;
wherein calculating the travel time for at least one of the plurality of segments comprises:
responsive to the segment including a sensor and traffic information generated by the sensor being available, calculating the travel time for the segment based on the traffic information; and
responsive to the segment not including a sensor, calculating the travel time for the segment based on weather effect information that describes effects that weather conditions over a period of time have had on the segment in the past.

18. The method of claim 12, wherein the likelihood of congestion for the plurality of routes is determined based on the weather effect information.

19. The method of claim 12, wherein each of the plurality of routes is comprised of a plurality of segments and determining the likelihood of congestion on one of the plurality of routes comprises:
determining a congestion level for each of the plurality of segments of the route; and
predicting the likelihood of congestion based on the congestion levels determined for the plurality of segments;
wherein determining the congestion level for at least one of the plurality of segments comprises:
responsive to the segment including a sensor and traffic information generated by the sensor being available, determining the congestion level for the segment based on the traffic information; and
responsive to the segment not including a sensor, determining the congestion level for the segment based on weather effect information that describes effects that weather conditions over a period of time have had on the segment in the past.

20. The method of claim 12, wherein the likelihood of an accident for the plurality of routes is determined based on the weather effect information.

21. The method of claim 12, wherein each of the plurality of routes is comprised of a plurality of segments and determining the likelihood of an accident on one of the plurality of routes comprises:
determining an accident level for each of the plurality of segments of the route; and
predicting the likelihood of an accident on the route based on the accident levels determined for the plurality of segments;
wherein determining the accident level for at least one of the plurality of segments comprises:

responsive to the segment including a sensor and traffic information generated by the sensor being available, determining the accident level for the segment based on the traffic information; and responsive to the segment not including a sensor, determining the accident level for the segment based on weather effect information that describes effects that weather conditions over a period of time have had on the segment in the past.

22. The method of claim 12, further comprising:
determining from the plurality of routes a route to recommend based on the determined traffic conditions; and
indicating to the user which of the plurality of routes is recommended.

23. The method of claim 12, further comprising:
directing a driver of a vehicle along one of the plurality of routes; and
warning the driver when approaching a segment of the route with a high likelihood of an accident.

24. The method of claim 12, wherein a telematics-navigation device at the vehicle wirelessly receives the weather effect information and determines the traffic conditions of the routes.

25. The method of claim 12, wherein a server in communication with a telematics-navigation device determines the traffic condition of the routes.

26. A computer-implemented method for predicting traffic conditions of a route, the method comprising:
identifying, by a computer system, a plurality of routes for a vehicle between a starting location and a destination location;
determining, by the computer system for each of the plurality of routes, predicted traffic conditions that include a travel time for the route, a likelihood of congestion on the route, and a likelihood of an accident on the route, wherein one or more of the traffic conditions are determined based on accident information describing accidents that have occurred on the route in the past under current circumstances; and
presenting to a user of the vehicle, by the computer system for each of the plurality of routes, each of the traffic conditions determined for the route.

27. The method of claim 26, wherein the starting location is a current location of the vehicle.

28. The method of claim 26, wherein each of the plurality of routes is comprised of a plurality of segments and determining the likelihood of congestion on one of the plurality of routes comprises:
determining a congestion level for each of the plurality of segments; and
predicting the likelihood of congestion based on the congestion levels determined for the plurality of segments;
wherein determining the congestion level for at least one of the plurality of segments comprises:
responsive to the segment including a sensor and traffic information generated by the sensor being available, determining the congestion level for the segment based on the traffic information; and
responsive to the segment not including a sensor, determining the congestion level for the segment based on accident information that describes accidents that have occurred on the segment in the past under current circumstances.

29. The method of claim 26, wherein each of the plurality of routes is comprised of a plurality of segments and determining the likelihood of an accident on one of the plurality of routes comprises:
determining an accident level for each of the plurality of segments of the route; and
predicting the likelihood of an accident on the route based on the accident levels determined for the plurality of segments;
wherein determining the accident level for at least one of the plurality of segments comprises:
responsive to the segment including a sensor and traffic information generated by the sensor being available, determining the accident level for the segment based on the traffic information; and
responsive to the segment not including a sensor, determining the accident level for the segment based on accident information that describes accidents that have occurred on the segment in the past under current circumstances.

30. The method of claim 26, further comprising:
determining from the plurality of routes a route to recommend based on the determined traffic conditions; and
indicating to the user which of the plurality of routes is recommended.

31. The method of claim 26, further comprising:
directing a driver of a vehicle along one of the plurality of routes; and
warning the driver when approaching a segment of the route with a high likelihood of an accident.

32. The method of claim 26, wherein a telematics-navigation device at the vehicle wirelessly receives the accident information and determines the traffic conditions of the routes.

33. The method of claim 26, wherein a server in communication with a telematics-navigation device determines the traffic conditions of the routes.

* * * * *